US012748071B2

(12) United States Patent
Kato et al.

(10) Patent No.: US 12,748,071 B2
(45) Date of Patent: Sep. 29, 2026

(54) ELECTROPHORESIS ASSISTANCE METHOD

(71) Applicant: HITACHI HIGH-TECH CORPORATION, Tokyo (JP)

(72) Inventors: Hirokazu Kato, Tokyo (JP); Ryusuke Kimura, Tokyo (JP); Noriyuki Sumida, Tokyo (JP); Isao Haraura, Tokyo (JP); Motohiro Yamazaki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 354 days.

(21) Appl. No.: 18/578,036

(22) PCT Filed: Aug. 24, 2021

(86) PCT No.: PCT/JP2021/031017

§ 371 (c)(1),
(2) Date: Jan. 10, 2024

(87) PCT Pub. No.: WO2023/026366

PCT Pub. Date: Mar. 2, 2023

(65) Prior Publication Data

US 2024/0337622 A1 Oct. 10, 2024

(51) Int. Cl.
*G01N 27/447* (2006.01)

(52) U.S. Cl.
CPC .............................. *G01N 27/44704* (2013.01)

(58) Field of Classification Search
CPC ............ B01L 3/502715; G01N 27/447; G01N 27/44704; G01N 27/44713;
(Continued)

(56) References Cited

U.S. PATENT DOCUMENTS

2004/0018638 A1 1/2004 Shoji et al.
2017/0315087 A1 11/2017 Onodera et al.
(Continued)

FOREIGN PATENT DOCUMENTS

JP 11-108889 A 4/1999
JP 2003-344356 A 12/2003
(Continued)

OTHER PUBLICATIONS

International Search Report of PCT/JP2021/031017 dated Nov. 2, 2021.

*Primary Examiner* — Gurpreet Kaur
(74) *Attorney, Agent, or Firm* — MATTINGLY & MALUR, PC

(57) ABSTRACT

To achieve efficient electrophoresis, after the last run is ended and before pre-run is performed, in a state where the electrophoresis medium used in the last run remains within a capillary, and two ends of the capillary are immersed in an electrophoresis buffer solution, whether a current value, which is based on a potential difference generated between the two ends of the capillary by applying a voltage by a high-voltage power supply to at least one of the electrophoresis buffer solutions on cathode and anode sides, is equal to or smaller than a first value is detected, and when the current value is equal to or smaller than the first value, an output section outputs a warning.

7 Claims, 9 Drawing Sheets

(58) Field of Classification Search
CPC ....... G01N 27/44721; G01N 27/44743; G01N 27/44756; G01N 27/44782; G01N 27/44791
See application file for complete search history.

(56) References Cited

U.S. PATENT DOCUMENTS

| | | | | |
|---|---|---|---|---|
| 2023/0121178 | A1 | 4/2023 | Noda et al. | |
| 2023/0194469 | A1* | 6/2023 | Tentori ............. | G01N 27/44704 204/457 |

FOREIGN PATENT DOCUMENTS

| | | | |
|---|---|---|---|
| JP | 3780226 | B2 | 5/2006 |
| JP | 2007-107915 | A | 4/2007 |
| JP | 2017-201286 | A | 11/2017 |
| WO | 2021/166210 | A1 | 8/2021 |

* cited by examiner

ELECTROPHORESIS ASSISTANCE METHOD

TECHNICAL FIELD

The present invention relates to a technique of an electrophoresis assistance method.

BACKGROUND ART

In recent years, a capillary electrophoresis apparatus, in which a capillary is filled with an electrophoresis medium such as a polymer gel or a polymer solution to perform electrophoresis, has been widely used as an electrophoresis apparatus. The capillary electrophoresis apparatus has high heat dissipation and can apply a high voltage to a sample, compared to a flat-plate electrophoresis apparatus, and is thus advantageously capable of performing electrophoresis at high speed. The capillary electrophoresis apparatus further has many advantages, such as small amount of sample to be required, automatic filling capability of an electrophoresis medium, and automatic sample injection capability. Such a capillary electrophoresis apparatus is used for various separation analysis measurements including analysis of nucleic acids or proteins.

In the capillary electrophoresis apparatus, it is necessary to replace an electrophoresis medium container and a capillary. During replacement of them, however, since a relay flow-path block is partially exposed to air, the air may be mixed into a flow path of the electrophoresis medium. During electrophoresis, a high voltage of several to several tens of kilovolts is applied between two ends of the flow path. Hence, if air bubbles exist within the flow path, the flow path may be electrically disconnected by the air bubbles. At this time, if the flow path is electrically disconnected, a high voltage difference occurs at the point of disconnection, leading to electric discharge. The capillary electrophoresis apparatus may be broken depending on magnitude of the electric discharge. It is therefore necessary to remove air bubbles from within the flow path before starting electrophoresis.

Patent literature 1 discloses an electrophoresis apparatus that performs (1) a procedure of filling a capillary with a separation medium, (2) a procedure of, prior to electrophoresis of a sample, applying a voltage lower than a voltage at which the sample is electrophoresed, to an energization path containing the separation medium, and thus detecting a current flowing through the energization path, and (3) a procedure of determining a state of the energization path on the basis of the detected current, and discloses an electrophoresis method.

CITATION LIST

Patent Literature 1: Japanese Patent No. 3780226

SUMMARY OF INVENTION

Technical Problem

In the processing by the capillary electrophoresis apparatus in the past, there is no idea of checking shortage of the amount of the reagents being consumables by checking an energization state of a flow path before starting sample electrophoresis.

More specifically, in the processing of the capillary electrophoresis apparatus in the past, when energization abnormality occurs, it has been not possible to identify a cause of the abnormality, i.e., to determine whether the energization abnormality is caused by an electrophoresis medium, by an anode-side electrophoresis buffer solution container, by a cathode-side electrophoresis buffer solution container, or by a sample container. As a result, a user must interrupt or stop run halfway. In addition, it is necessary to restart the run after replacing a buffer being a buffer solution, a polymer being an electrophoresis medium, and the sample. Such operations are complicated, resulting in poor usability. In addition, if energization abnormality occurs, for example, it is necessary to reset reagents and replace an unnecessary reagent, causing an increase in running cost.

An object of the present invention, which has been made in view of such background, is to achieve efficient electrophoresis.

Solution to Problem

In order to solve the above problem, an electrophoresis assistance method of this invention includes: in an electrophoresis method, performing a first electrophoresis such that a power supply generates a potential difference between two ends of a capillary, and thus an electrophoresis medium is electrophoresed into the capillary, and performing, after the first electrophoresis, a second electrophoresis such that the power supply generates the potential difference between the two ends of the capillary, and thus a sample added to the electrophoresis medium is electrophoresed into the capillary; and performing, in the second electrophoresis, component separation of the sample according to a difference in speed at which the sample moves within the capillary, due to the potential difference across the capillary generated by the power supply. In the electrophoresis assistance method, a processor performs: a first energization check step in which after the previous second electrophoresis is ended and before the first electrophoresis is performed, in a state where the electrophoresis medium used in the previous second electrophoresis remains within the capillary, and if the amount of an electrophoresis buffer solution stored in each separate container is equal to or larger than a predetermined amount, the two ends of the capillary are located at predetermined positions where the two ends of the capillary are each in contact with the electrophoresis buffer solution, and whether a measurement value, the measurement value being based on a current flowing through the capillary, the current being based on the potential difference generated between the two ends of the capillary by applying a voltage to at least one of the electrophoresis buffer solutions by the power supply, or a measurement value, the measurement value being based on the potential difference between the two ends of the capillary, is equal to or smaller than a first value is detected; and a first warning step in which if the measurement value is equal to or smaller than the first value in the first energization check step, an output section outputs a warning.

Other solution will be appropriately described in embodiments.

Advantageous Effects of Invention

According to this invention, an efficient electrophoresis can be achieved.

DESCRIPTION OF EMBODIMENTS

A mode for carrying out the present invention (referred to as "embodiment") will now be described in detail with reference to FIGS. 1 to 5 as appropriate.

Capillary Electrophoresis Apparatus 1

Figure 1:
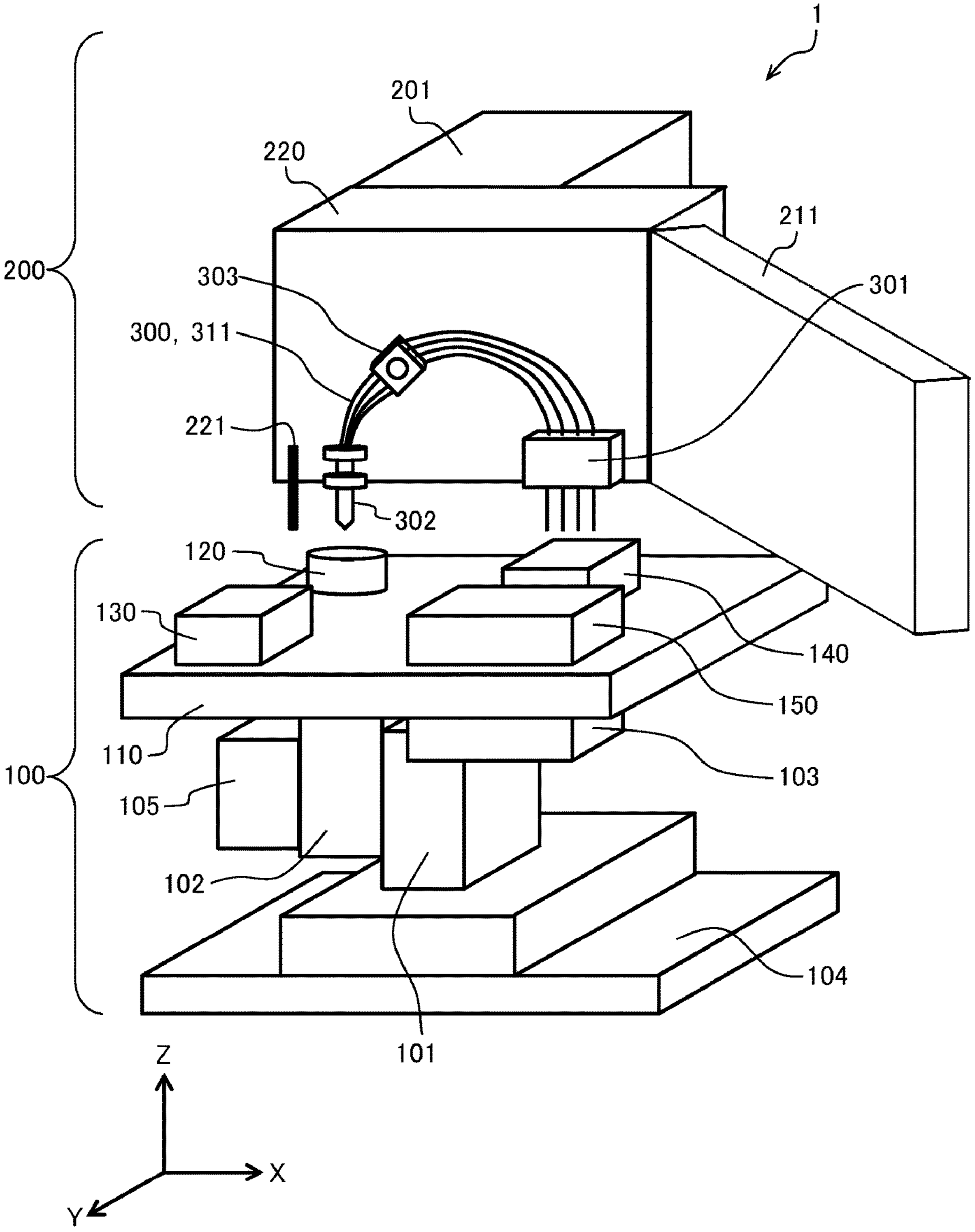
FIG. 1 is a schematic perspective view of a capillary electrophoresis apparatus of this embodiment.

FIG. 1 is a schematic perspective view of a capillary electrophoresis apparatus 1 according to this embodiment.

In FIG. 1, the X axis corresponds to the width direction of the capillary electrophoresis apparatus 1, the Y axis corresponds to the depth direction of the capillary electrophoresis apparatus 1, and the Z axis corresponds to the height direction of the capillary electrophoresis apparatus 1. The upward direction is a direction from an autosampler unit 100 toward an irradiation detection/thermostatic oven unit 200, and the downward direction is a direction opposite to the upward direction. The upward direction is also the Z axis direction. The front is a direction from an irradiation detection unit 201 toward a thermostatic oven unit 220, and the back is a direction opposite to the front.

The capillary electrophoresis apparatus 1 includes the autosampler unit 100 and the irradiation detection/thermostatic oven unit 200 disposed above the autosampler unit 100.

Autosampler Unit 100

The autosampler unit 100 includes a sample tray 110. On the sample tray 110, an electrophoresis medium container 120, an anode-side container 130, a cathode-side container 140, and a sample container 150 are set by a user.

The autosampler unit 100 further includes a sampler base 104, a Y-axis driver 101, a Z-axis driver 102, an X-axis driver 103, a liquid feeding device 105, and the like.

The electrophoresis medium container 120 stores an electrophoresis medium 120*a* (see FIG. 2) with which capillaries 311 configuring a capillary array 300 are filled. The electrophoresis medium 120*a* is a polymer gel, a polymer solution, or the like.

The anode-side container 130 stores an electrophoresis buffer solution 160 (see FIG. 2) and the like, to which a positive voltage is applied during electrophoresis. The anode-side container 130 is described in detail later.

The cathode-side container 140 stores an electrophoresis buffer solution 160 (see FIG. 2) and the like, to which a negative voltage is applied during electrophoresis. The cathode side-container 140 is described later.

The sample container 150 stores a sample reagent 150*a* (see FIG. 2) in which a sample which is an object to be analyzed by electrophoresis is dissolved.

The sample container 150 is movable in the X-axis direction by the X-axis driver 103 set on the sample tray 110. Among the containers provided on the sample tray 110, only the sample container 150 is movable in the X-axis direction (horizontal direction).

The sampler base 104 supports the entire capillary electrophoresis apparatus 1.

In the example shown in FIG. 1, the Y-axis driver 101 is mounted on the sampler base 104, and moves the sample tray 110 in the Y-axis direction.

In the example shown in FIG. 1, the Z-axis driver 102 is provided on the Y-axis driver 101 and moves the sample tray 110 in the Z-axis direction. In the example shown in FIG. 1, the sample tray 110 is set on the Z-axis driver 102, and the Y-axis driver 101 moves the sample tray 110 via the Z-axis driver 102. The Y-axis driver 101 and the Z-axis driver 102 can move the electrophoresis medium container 120, the anode-side container 130, the cathode-side container 140, and the sample container 150 together with the sample tray 110 in the Y-axis direction (longitudinal direction) and the Z-axis direction (vertical direction).

The liquid feeding device 105 feeds the electrophoresis medium 120*a* from the electrophoresis medium container 120 to the capillaries 311 that configure the capillary array 300. The liquid feeding device 105 is set below the electrophoresis medium container 120. In the example shown in FIG. 1, the liquid feeding device 105 is set on the Z-axis driver 102.

Irradiation Detection/Thermostatic Oven Unit 200

The irradiation detection/thermostatic oven unit 200 includes a thermostatic oven unit 220 and an irradiation detection unit 201.

The thermostatic oven unit 220 includes a capillary array 300, an electrode 221, and the like. The capillary array 300 includes a load header 301, a capillary head 302, a detection section 303, and the like.

The thermostatic oven unit 220 includes a thermostatic oven door 211, and thus can maintain the inside of the thermostatic oven unit 220 at a constant temperature.

The irradiation detection unit 201 is provided behind the thermostatic oven unit 220. The irradiation detection unit 201 allows sample detection during electrophoresis.

The capillary array 300 is set in the thermostatic oven unit 220 by a user. The capillary array 300 is configured of a plurality of capillaries 311. Electrophoresis is performed while the capillary array 300 is kept at constant temperature within the thermostatic oven unit 220. Results of the electrophoresis are detected by the irradiation detection unit 201. The thermostatic oven unit 220 has the electrode 221 connected to ground (GND) 411 (see FIG. 3A).

The load header 301 and the capillary head 302 are described later.

The detection section 303 is provided in the middle of the capillary array 300. Within the detection section 303, the capillaries 311 are arranged in a planar shape at regular intervals. The irradiation detection unit 201 irradiates the capillaries 311 arranged in the detection section 303 with light. The detection section 303 detects fluorescence, or the like generated from a sample electrophoresing through each capillary 311, by the light irradiation.

As mentioned above, the capillary array 300 is fixed to the thermostatic oven unit 220. As mentioned above, the electrophoresis medium container 120, the anode-side container 130, the cathode-side container 140, and the sample container 150 can be moved together with the sample tray 110 in the Y-axis and Z-axis directions by the Y-axis driver 101 and the Z-axis driver 102. Furthermore, as mentioned above, only the sample container 150 can be driven in the X-axis direction by the X-axis driver 103 in addition to the Y-axis and Z-axis directions. Such movement allows an end of the capillary array 300 fixed to the thermostatic oven unit 220 to come into liquid-contact with of the reagents in each stored the electrophoresis medium container 120, the anode-side container 130, the cathode-side container 140, and the sample container 150 at any appropriate position. While being described in detail later, the material stored in the electrophoresis medium container 120, the anode-side container 130, the cathode-side container 140, or the sample container 150 is referred to as a reagent.

In the capillary electrophoresis apparatus 1, a potential difference is generated between two ends of the capillary array 300, and the sample moves within the capillary 311 according to an electric field generated in the capillary 311 due to the potential difference. Component separation (component analysis) is performed depending on speed at which the sample moves within the capillary 311.

Figure 2:
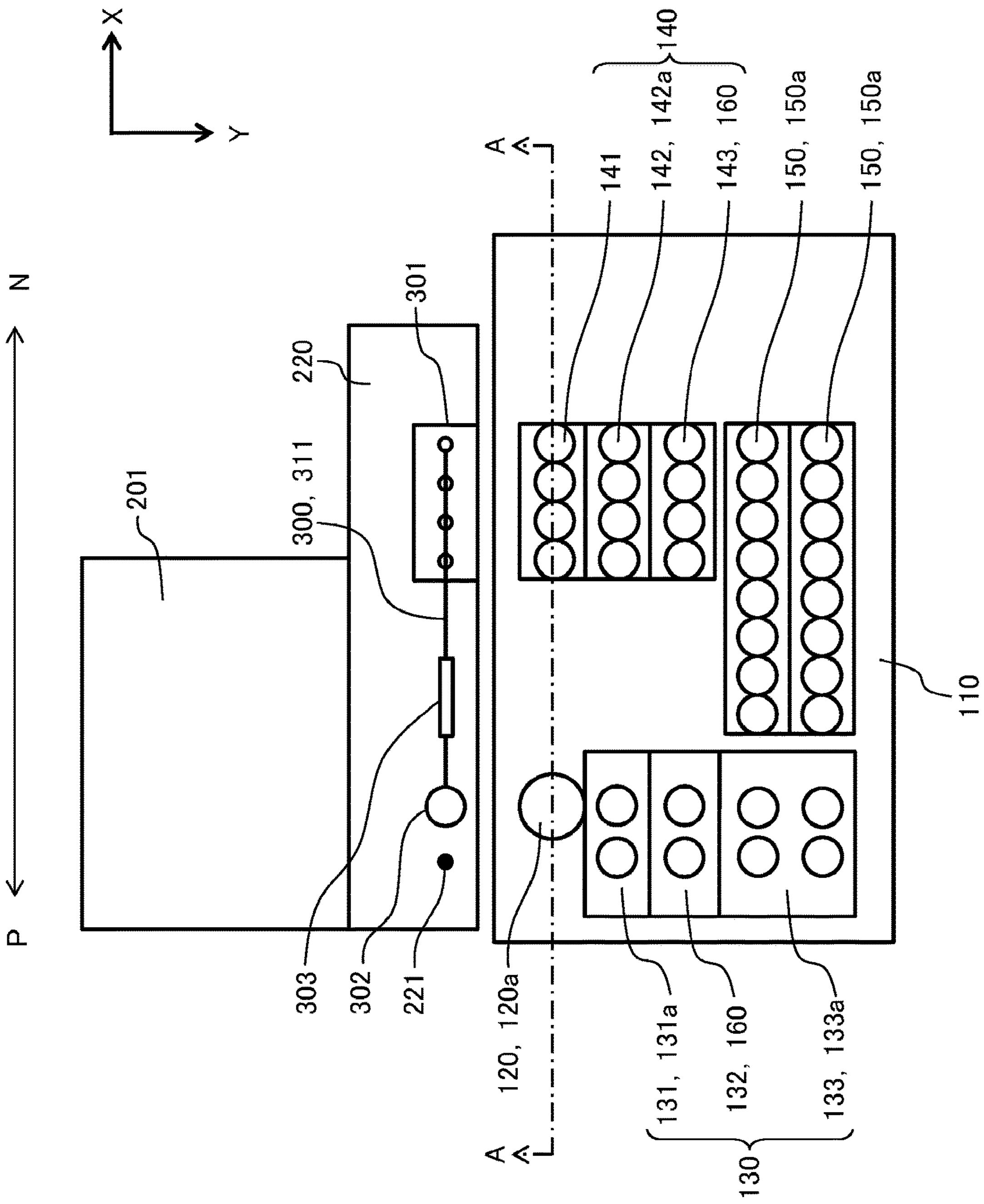
FIG. 2 is a top view of the capillary electrophoresis apparatus.

FIG. 2 is a top view of the capillary electrophoresis apparatus 1. In the example shown in FIG. 2, the sample tray 110 is located at a position where the capillary array 300 accesses no container.

In FIG. 2, the same component as in FIG. 1 is designated by the same sign, and duplicated description is omitted.

The anode-side container 130 set on the sample tray 110 has an anode-side cleaning container 131, an anode-side electrophoresis buffer solution container 132, and a sample buffer solution container 133. The cathode-side container 140 has a waste liquid container 141, a cathode-side cleaning container 142, and a cathode-side electrophoresis buffer solution container 143.

In this embodiment, since a negative potential is applied to the load header 301, the load header 301 side is the cathode side N, and the capillary head 302 side is the anode side P. In this embodiment, a negative potential is a potential lower than a potential of the GND 411 or 412 (see FIG. 3A).

The anode-side cleaning container 131 stores an anode-side cleaning liquid 131*a* for cleaning the capillary head 302. The anode-side electrophoresis buffer solution container 132 stores the electrophoresis buffer solution 160 to be on the positive potential side during electrophoresis. The sample buffer solution container 133 stores a sample buffer solution 133*a* that is a buffer solution to introduce the sample into the capillary 311 during sample introduction.

Hereinafter, the anode-side cleaning liquid 131*a*, the electrophoresis buffer solution 160 stored in the anode-side electrophoresis buffer solution container 132, and the sample buffer solution 133*a* are collectively referred to as anode-side reagent as appropriate.

When the capillary 311 is filled with the electrophoresis medium 120*a*, the waste container 141 receives the electrophoresis medium 120*a* aspirated from the electrophoresis medium container 120 to one end of the capillary 311 and discharged from the other end. The cathode-side cleaning container 142 stores a cathode-side cleaning liquid 142*a* for cleaning the cathode-side end of the capillary 311. The cathode-side electrophoresis buffer solution container 143 stores the electrophoresis buffer solution 160 to be on the negative potential side during electrophoresis.

The electrophoresis buffer solution 160 stored in the cathode-side electrophoresis buffer solution container 143 and the cathode-side cleaning liquid 142*a* are collectively referred to as cathode-side reagent as appropriate.

As mentioned above, the anode-side reagent, the cathode side reagent, and the electrophoresis medium 120*a* are collectively referred to as reagents as appropriate.

As mentioned above, the sample container 150 stores the sample reagent 150*a* being a solution in which a sample (in this embodiment, DNA) is dissolved.

The electrophoresis medium container 120, the anode-side container 130, the cathode-side container 140, and the sample container 150 are arranged in a positional relationship as shown in FIG. 2. As a result, positional relationships between the anode side P and the cathode side N during connection with the capillary array 300 are as follows: "Electrophoresis medium container 120—waste liquid container 141", "anode-side cleaning container 131—cathode-side cleaning container 142", "anode-side electrophoresis buffer solution container 132—cathode-side electrophoresis buffer solution container 143", and "sample buffer solution container 133—sample container 150".

The meaning of the above "electrophoresis medium container 120-waste liquid container 141" is as follows. The electrophoresis medium container 120 is disposed on the anode side P, and the waste liquid container 141 is disposed on the cathode side N. The electrophoresis medium container 120 and the waste liquid container 141 are arranged in series in the X-axis direction. The electrophoresis medium container 120 is disposed at a position where the capillary head 302 can come into liquid-contact therewith by moving the sample tray 110. The waste liquid container 141 is disposed at a position where the cathode-side end of the capillary 311 can come into liquid-contact therewith by moving the sample tray 110.

The same applies to "anode-side cleaning container 131-cathode-side cleaning container 142", "anode-side electrophoresis buffer solution container 132-cathode-side electrophoresis buffer solution container 143", and "sample buffer solution container 133—sample container 150". However, the anode-side cleaning container 131 and the anode-side electrophoresis buffer solution container 132 are each configured such that the capillary head 302 and the electrode 221 can come into liquid-contact therewith at the same time. In contrast, the electrophoresis medium container 120 is disposed such that only the capillary head 302 can come into liquid-contact therewith. This is because the electrophoresis medium 120*a* stored in the electrophoresis medium container 120 is not introduced into the capillary 311 by a potential difference, but by the liquid feeding device 105.

Figure 3A:
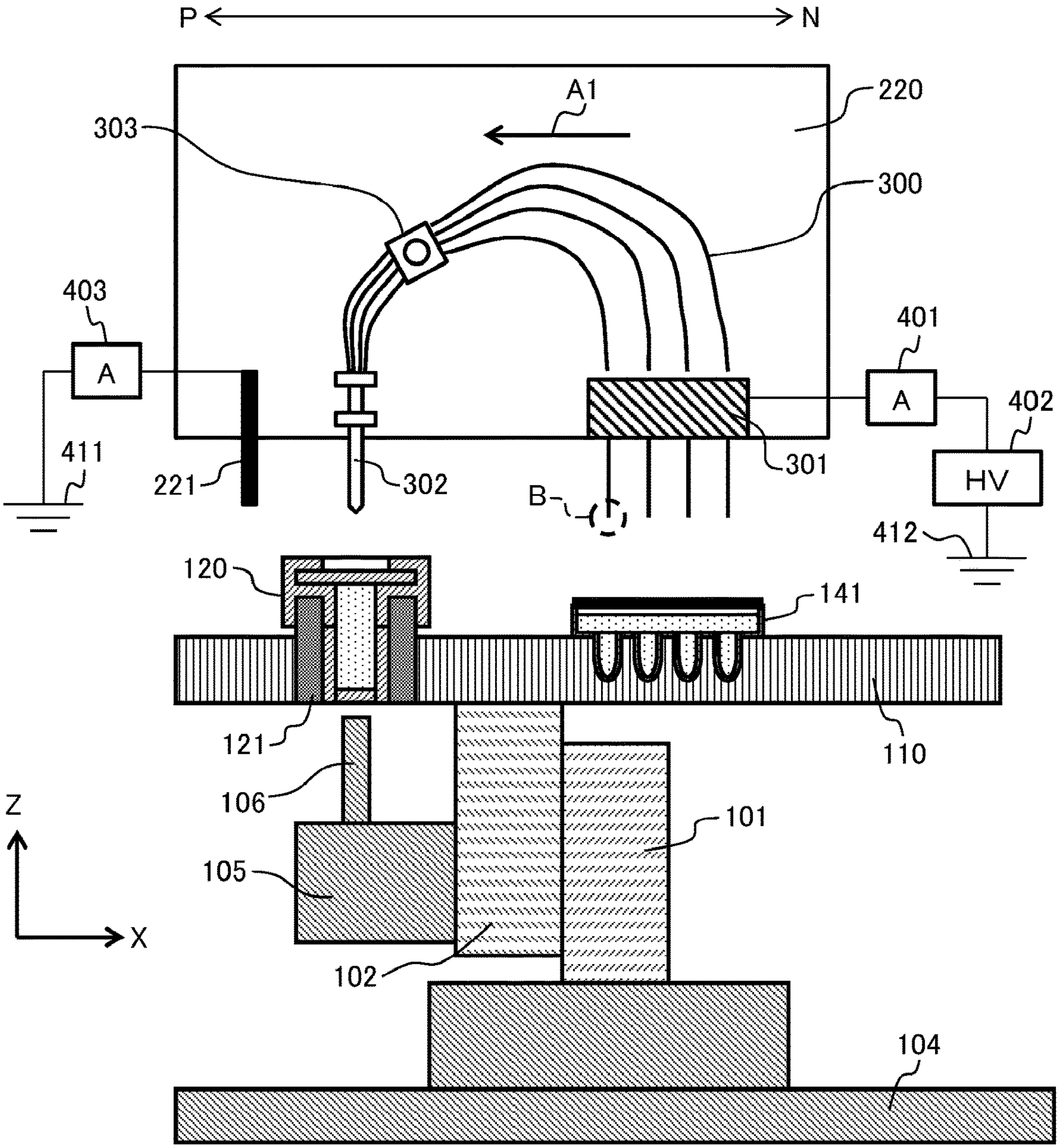
FIG. 3A is a schematic cross-sectional view of the capillary electrophoresis apparatus.

FIG. 3A is a cross-sectional diagram along the line A-A in FIG. 2.

In FIG. 3A, the same components as in FIGS. 1 and 2 are designated by the same signs, and duplicated description is omitted.

FIG. 3A shows a state where the cathode-side ends of the capillary head 302 and the capillaries 311 in FIG. 2 can come into liquid-contact with the electrophoresis medium container 120 and the waste liquid container 141, respectively.

The electrophoresis medium container 120 is inserted into a guide 121 embedded in the sample tray 110 and is thus set. A plunger 106 provided on the liquid feeding device 105 is disposed so as to be located below the electrophoresis medium container 120. The plunger 106 pushes up a cylinder (not shown) provided in the electrophoresis medium container 120, so that the electrophoresis medium 120*a* is introduced into capillary 311.

Figure 3B:
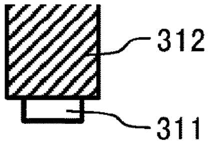
FIG. 3B is an enlarged view of a cathode-side end of a capillary.

FIG. 3B is an enlarged view of a portion indicated by a dashed circle B in FIG. 3A. In other words, FIG. 3B shows the cathode-side end of the capillary 311.

As illustrated in FIG. 3B, the individual capillary 311 configuring the capillary array 300 is fixed through a metal hollow electrode 312. The hollow electrode 312 is provided on a part (from the cathode-side end to the load header 301) of the capillary 311.

As illustrated in FIG. 3B, the tip end of the capillary 311 protrudes about 0.5 mm from the hollow electrode 312. The length of the hollow electrode 312 protruding at the tip end of the capillary 311 is not limited to 0.5 mm. Furthermore, all of the hollow electrodes 312 provided in the respective capillaries 311 are fitted in the load header 301 (see FIG. 3A) in an integrated manner. All the hollow electrodes 312 are connected to a high-voltage power supply 402 via the load header 301. Since the high-voltage power supply 402 applies a negative voltage to the hollow electrode 312, the hollow electrode 312 becomes a cathode electrode during voltage application to the hollow electrode 312, such as during electrophoresis or during sample introduction.

Returning to description of FIG. 3A.

As mentioned above, during electrophoresis, the right side of the paper in FIG. 3 is the cathode side N, and the left side thereof is the anode side P with respect to the capillary array 300. The anode-side ends of the capillaries 311 are bundled together by the capillary head 302. The capillary head 302 is a bundled, pressure-tight-sealed, detachable component, in which the capillaries 311 are held together in a bundle with pressure-tight seal.

A case, where the cathode-side ends of the capillary head 302 and the capillaries 311 are respectively in liquid-contact with the anode-side electrophoresis buffer solution container 132 and the cathode-side electrophoresis buffer solution container 143, is now described with reference to FIGS. 2 and 3A.

Before electrophoresis of the sample, the anode-side end and cathode-side end of the capillary 311 are moved by the Y-axis driver 101 to positions at which the respective ends can be in liquid-contact with the anode-side electrophoresis buffer solution container 132 and the cathode-side electrophoresis buffer solution container 143. The anode-side end of the capillary 311 means the capillary head 302. The capillary head 302 and the electrode 221 come into liquid-contact by the Z-axis driver 102 with the electrophoresis buffer solution 160 stored in the anode-side electrophoresis buffer solution container 132. The cathode-side end of the capillary 311 comes into liquid-contact with the electrophoresis buffer solution 160 stored in the cathode-side electrophoresis buffer solution container 143. A high voltage (negative voltage) is then applied to the hollow electrode 312 via the load header 301 by the high-voltage power supply 402. As mentioned above, the high-voltage power supply 402 is a negative power supply that applies a negative voltage of about minus several tens of kilovolts to the hollow electrode 312.

As a result, current flows in the order of the GND 411, the electrode 221, the anode-side electrophoresis buffer solution container 132, the capillaries 311, the cathode-side electrophoresis buffer solution container 143, and the high-voltage power supply 402 (negative power supply). In other words, the energization path is a path from the GND411 to the high-voltage power supply 402 (negative power supply) through the electrode 221, the electrophoresis buffer solution 160 in the anode-side electrophoresis buffer solution container 132, the capillaries 311, and the electrophoresis buffer solution 160 in the cathode-side electrophoresis buffer solution container 143. The energization path is described in detail later. However, the sample buffer solution 133*a* stored in the sample buffer solution container 133 may serve as the energization path instead of the electrophoresis buffer solution 160 in the anode-side electrophoresis buffer solution container 132. Similarly, the sample reagent 150*a* in the sample container 150 may serve as the energization path instead of the electrophoresis buffer solution 160 in the cathode-side electrophoresis buffer solution container 143.

As a result, a negatively charged sample (DNA in this embodiment example) is electrophoresed in the direction of the arrow A1 in FIG. 3A. Electric current flowing through the energization path can be monitored by a first ammeter 401 and a second ammeter 403. The high-voltage power supply 402 has one side connected to the hollow electrode 312 via the first ammeter 401 and the other side connected to the GND 412.

Thus, during electrophoresis, a negative voltage is applied to the cathode side N of the capillary array 300 by the high-voltage power supply 402 as mentioned above, and current flows through the above-described energization path, so that electrophoresis is performed.

Control Configuration

Figure 4:
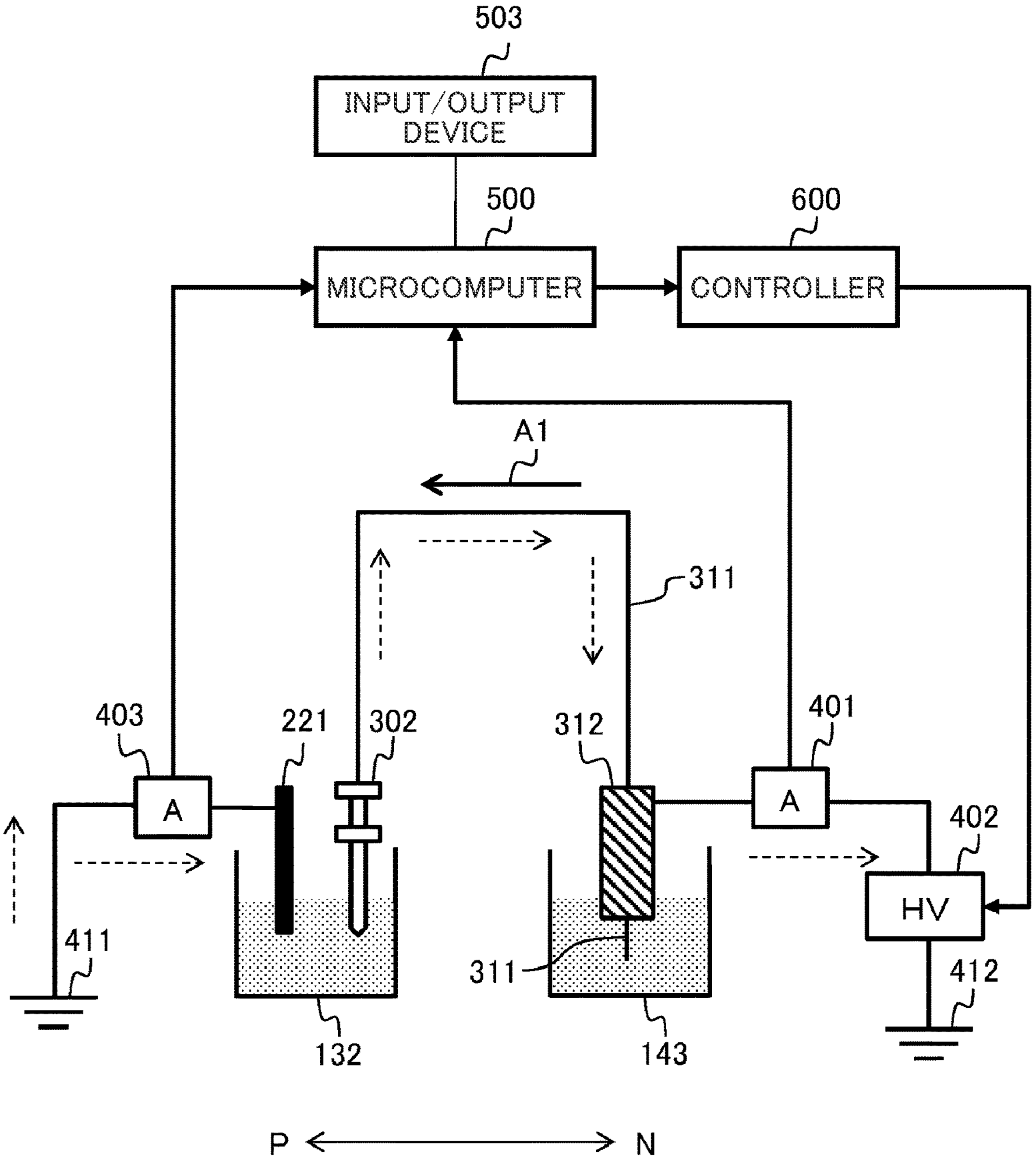
FIG. 4 is a diagram illustrating a control configuration of the capillary electrophoresis apparatus.

FIG. 4 is a diagram illustrating a control configuration of the capillary electrophoresis apparatus 1.

The capillary electrophoresis apparatus 1 includes a microcomputer 500, a controller 600, the high-voltage power supply 402, the first ammeter 401, and the second ammeter 403.

The microcomputer 500 performs energization check through processing described later with reference to FIGS. 6A and 6B, and outputs results of the energization check to the input/output device 503. The input/output device 503 is configured of a touch panel, for example.

The controller 600 controls voltage application to the energization path by controlling the high-voltage power supply 402, movement of the sample tray 110, movement of the sample container 150 by the X-axis driver 103, and the like.

The high-voltage power supply 402 is connected to the load header 301 (see FIG. 3A) and the hollow electrodes 312 via the first ammeter 401. The electrode 221 is electrically connected to the GND 411 via the second ammeter 403. When a negative voltage of minus several tens of kilovolts is applied to the hollow electrode 312 by the high-voltage power supply 402, a voltage (potential difference) of several tens of kilovolts is generated between the anode-side end and the cathode-side end of the capillary 311. As a result, an electric field is generated within the capillary 311 in a direction from the electrode 221 to the hollow electrode 312. As mentioned above, the generated electric field causes the negatively charged sample such as nucleic acid to move from the cathode-side end of the capillary 311 toward the capillary head 302 (arrow A1).

At this time, the first ammeter 401 measures a value of the current flowing from the hollow electrode 312 to the high-voltage power supply 402, and transmits the current value to the microcomputer 500. The second ammeter 403 measures a value of the current flowing from the electrode 221 to the GND 411 and transmits the current value to the microcomputer 500. As mentioned above, since the high-voltage power supply 402 generates a voltage (negative voltage) lower than that of the GND 411 or 412, when a negative voltage is applied by the high-voltage power supply 402, current flows as shown by the broken-line arrow in FIG. 4. Specifically, as mentioned above, the current flows in the order of the GND 411, the second ammeter 403, the electrode 221, the capillary 311, the hollow electrode 312, the first ammeter 401, and the high-voltage power supply 402. As mentioned above, a path from the GND411 to the high-voltage power supply 402 through the second ammeter 403, the electrode 221, the capillary 311, the hollow electrode 312, and the first ammeter 401 is referred to as the energization path.

In this embodiment, the second ammeter 403 is used to check the current value and a variation of the current value. The reason for this is that the second ammeter 403 reflects the value of the current flowing through the electrophoresis path more directly than the first ammeter 401. If electric leakage or the like occurs between the first ammeter 401 and the second ammeter 403 (in other words, between the hollow electrode 312 and the electrode 221), a value indicated by the first ammeter 401 includes a current value of the electric leakage, while a value indicated by the second ammeter 403 (measurement value based on a current flowing through the capillary 311) includes no current value of the electric leakage.

In other words, the second ammeter 403 detects the net value of the current flowing through the energization path (measurement value based on the current flowing through the capillary 311). A medium having a relatively higher resistance than metal, such as the electrophoresis buffer solution 160 or the electrophoresis medium 120*a*, is interposed in a portion between the first ammeter 401 and the second ammeter 403. Furthermore, many connections such as the load header 301 exist between the first ammeter 401 and the second ammeter 403. Hence, it can be said that electric leakage is likely to occur in a circuit portion via the first ammeter 401.

The above is described in detail.

As shown by the dashed arrows in FIG. 4, the first ammeter 401 measures a current through the capillary 311, the hollow electrode 312, and the like. In other words, electric leakage in the capillary 311 or the like affects a current value measured by the first ammeter 401. On the other hand, the second ammeter 403 measures a current between the GND 411 and the electrode 221. This measurement value (current value: measurement value based on a current flowing through the capillary 311) is not affected by the electric leakage in the capillary 311 or the like. if the energization path is interrupted due to a drop of the level of the electrophoresis buffer solution 160 or air bubbles entering the capillary 311, the potential of the electrode 221 immediately becomes the same as the GND 411, and a current flowing through the second ammeter 403 has a value of zero. Although the current value measured by the first ammeter 401 also becomes zero with the energization path interrupted, in consideration of influence of the electric leakage, etc., the current value measured by the second ammeter 403 is desirably used. The first ammeter 401 therefore can be omitted. However, the first ammeter 401 can also be used for energization check (described later) in this embodiment.

Hence, a current value (measurement value based on the current flowing through the capillary 311) indicated by the second ammeter 403 is used for the energization check (described later) in this embodiment.

Although this embodiment is described with the case where the high-voltage power supply 402 is a negative power supply, a positive power supply may be used as the high-voltage power supply 402 depending on samples. In such a case, energization check described later should be performed using a current value measured by the first ammeter 401 (measurement value based on a current flowing through the capillary 311).

In this embodiment, an energization state is checked on the basis of the current value measured by the second ammeter 403 (or the first ammeter 401). However, not limited to this, a voltmeter may be used instead of the second ammeter 403 (or the first ammeter 401), and the voltage value measured by the voltmeter may be used to check the energization state. The voltage value measured by the voltmeter is a measurement value based on a potential difference generated between two ends of a capillary 311 when a voltage is applied to the two ends of the capillary 311. In a possible case, a voltmeter is used instead of each of the first and second ammeters 401 and 403, and the high-voltage power supply 402, to which a negative voltage is applied, is disposed as in this embodiment. In such a case, a voltage value (measurement value) measured by the voltmeter set at the location of the second ammeter should be used for energization check. Conversely, if the high-voltage power supply 402 applies a positive potential, a voltage value (measurement value) measured by the voltmeter set at a location of the first ammeter should be used for energization check.

In this embodiment, it is assumed that the microcomputer 500, the input/output device 503, and the controller 600 are built in the capillary electrophoresis apparatus 1. However, not limited to this, the microcomputer 500, the input/output device 503, and the controller 600 may be provided as separate devices from the capillary electrophoresis apparatus 1.

Configuration Diagram of Microcomputer 500

Figure 5:
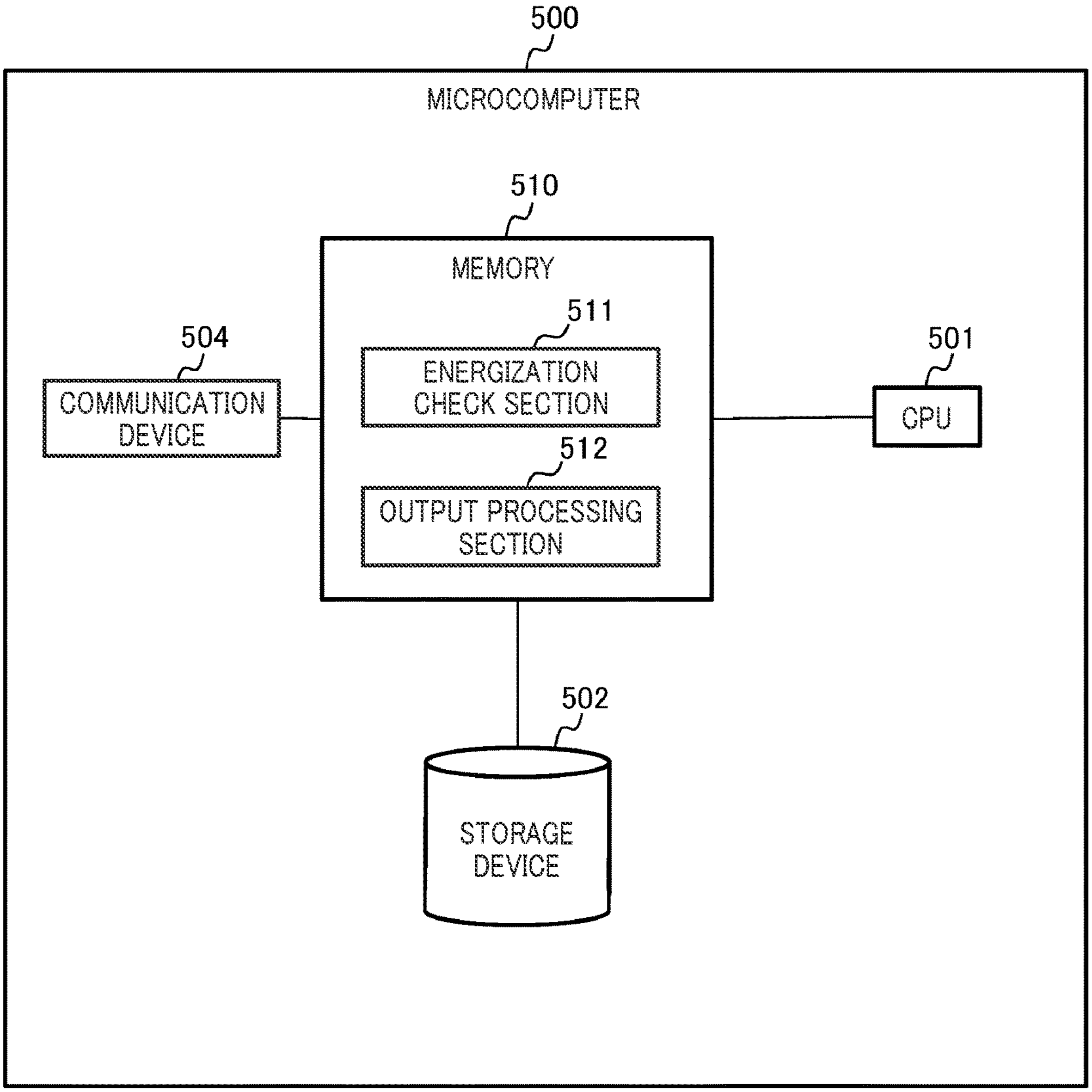
FIG. 5 is a diagram illustrating an exemplary configuration of a microcomputer.

FIG. 5 is a diagram illustrating an exemplary configuration of the microcomputer 500.

The microcomputer 500 includes a memory 510 such as a read only memory (ROM), a central processing unit (CPU) 501, and a storage device 502 such as random access memory (RAM). The microcomputer 500 further includes a communication device 504 that receives information from the first ammeter 401, the second ammeter 403, and the like.

The memory 510 stores a program, and the CPU 501 executes the program so that an energization check section 511 and an output processing section 512 become effective.

The energization check section 511 performs energization check on the basis of a current value (measurement value based on a current flowing through the capillary) measured by the second ammeter 403. Energization check is described later.

The output processing section 512 causes the input/output device 503 to display warning screens 701 to 705, etc., shown in FIGS. 7A to 7E in accordance with results of the energization check by the energization check section 511.

Flowchart

Figure 6A:
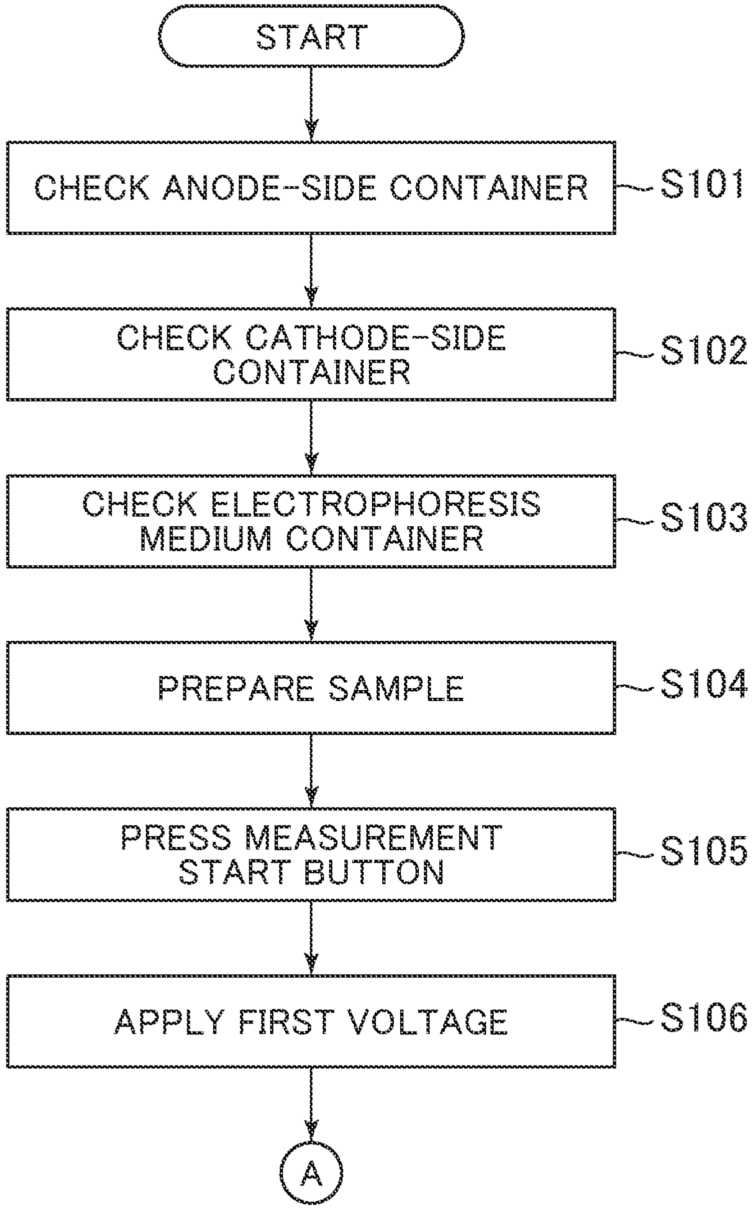
FIG. 6A is a flowchart (1) illustrating a procedure of processing according to this embodiment.
Figure 6B:
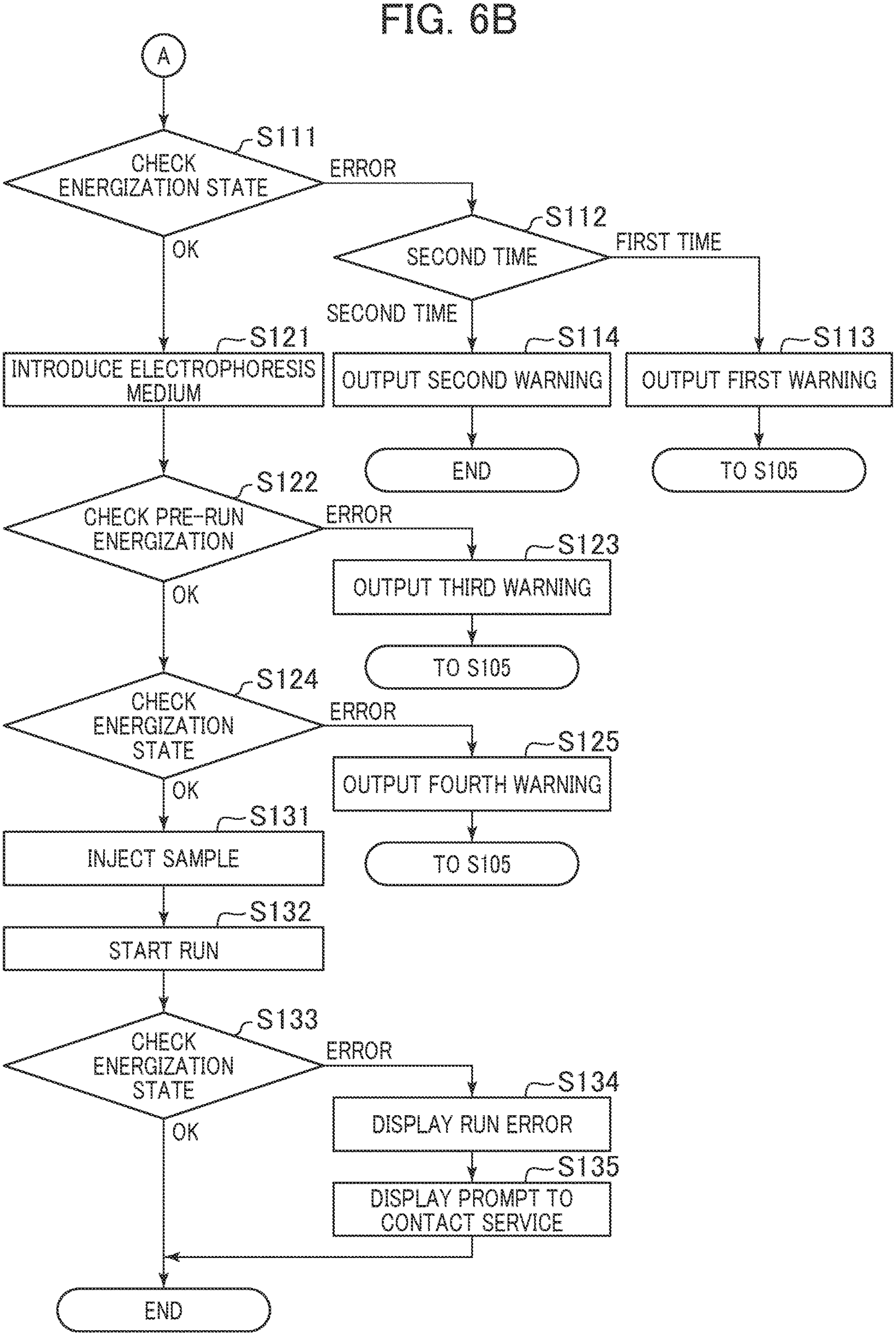
FIG. 6B is a flowchart (2) illustrating the procedure of processing according to this embodiment.

FIGS. 6A and 6B are flowcharts illustrating a procedure of the processing according to this embodiment.

Figure 7A:
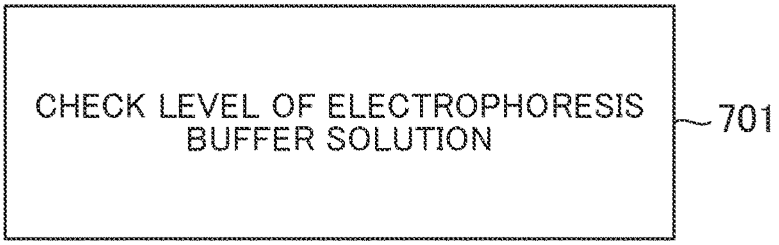
FIG. 7A is a view of an exemplary warning screen (1).
Figure 7B:
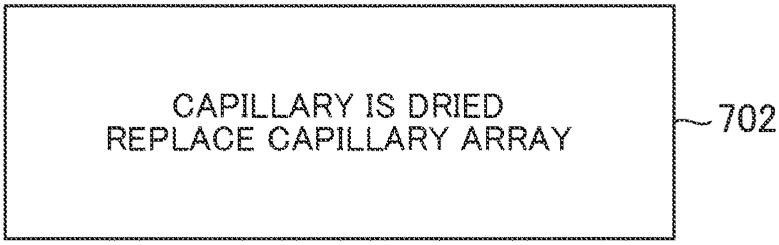
FIG. 7B is a view of an exemplary warning screen (2).
Figure 7C:
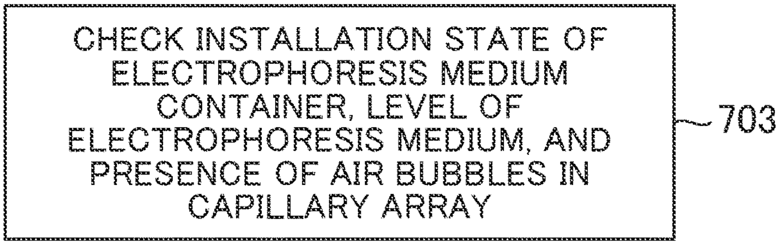
FIG. 7C is a view of an exemplary warning screen (3).
Figure 7D:
FIG. 7D is a view of an exemplary warning screen (4).
Figure 7E:
FIG. 7E is a view of an exemplary warning screen (5).
Figure 8:
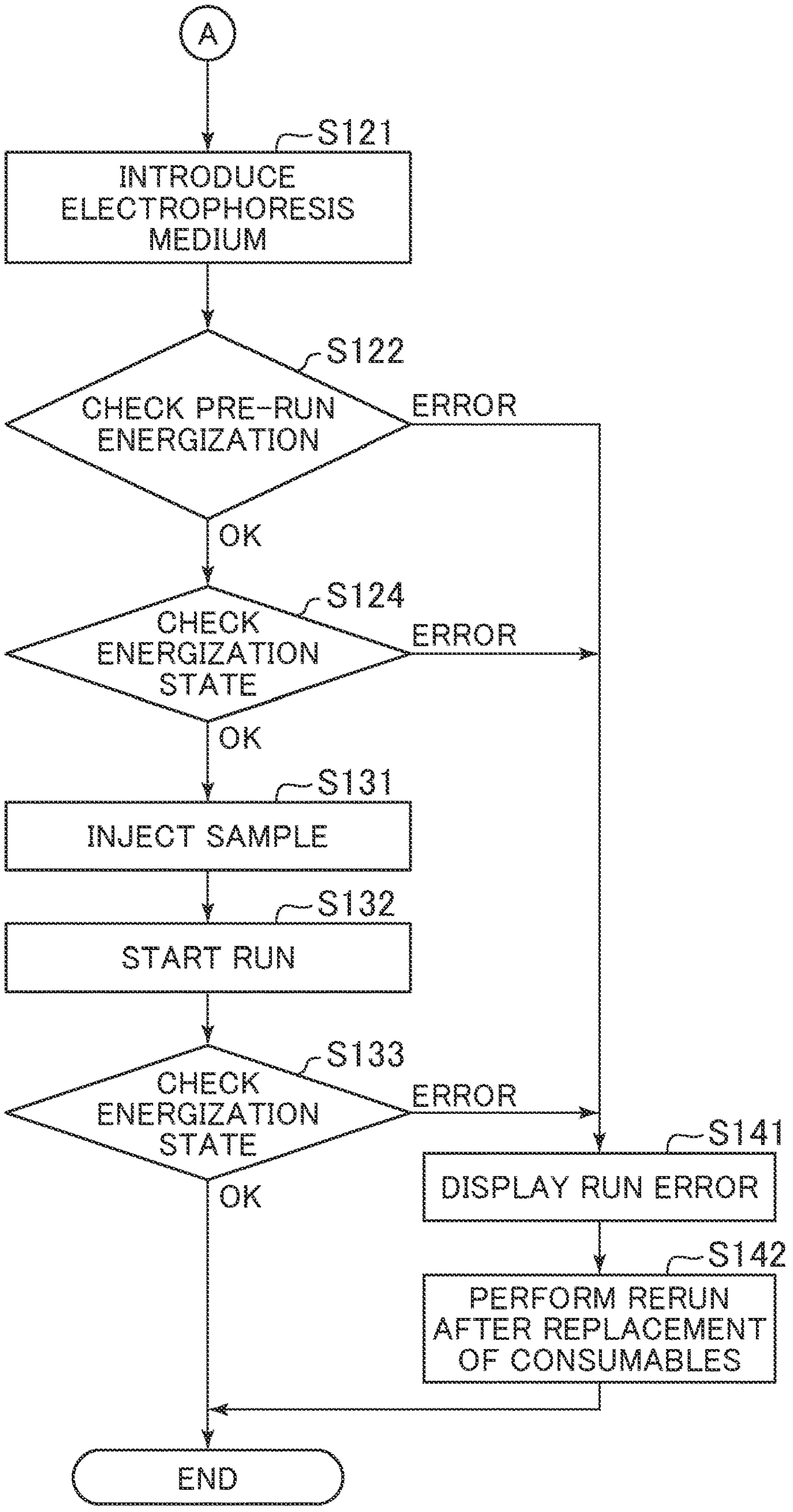
FIG. 8 is a flowchart illustrating a procedure of an electrophoresis assistance method with a capillary electrophoresis apparatus in the past.

In FIGS. 6A and 6B and FIG. 8, run means that a sample added to the electrophoresis medium 120*a* is electrophoresed into the capillary 311 due to a potential difference generated between the two ends of the capillary 311 by the high-voltage power supply 402. During run, the sample is detected by the irradiation detection unit 201. FIGS. 7A to 7E show exemplary warning screens 701 to 705 output to the input/output device 503. First, the processing shown in step S101 in FIG. 6A is assumed to be started after previous run (previous second electrophoresis) has ended and before pre-run (first electrophoresis) is performed. The previous run means electrophoresis of a sample performed before the current run. The pre-run means that the electrophoresis medium 120*a* is electrophoresed prior to electrophoresis of the sample.

FIGS. 1 to 5 are referenced as appropriate.

A user checks the anode-side container 130 when starting analysis (S101 in FIG. 6A). In step S101, the user visually checks whether containers configuring the anode-side container 130 are set in the capillary electrophoresis apparatus 1, a level of each anode-side reagent, and the like. The containers configuring the anode-side container 130 are the anode-side cleaning container 131, the anode-side electrophoresis buffer solution container 132, and the sample buffer solution container 133. As mentioned above, the anode-side reagent collectively includes the anode-side cleaning liquid 131*a*, the electrophoresis buffer solution 160 stored in the anode-side electrophoresis buffer solution container 132, and sample buffer solution 133*a*.

If at least one of the containers configuring the anode-side container 130 is not set, the user sets anew a container that has been unset. When the anode-side reagent has a low level, the user replaces the corresponding container. The case where the anode-side reagent has a low level is a case where the level of the anode side reagent is lower than a predetermined level. Whether the level is lower than the predetermined level or not is determined by the user based on whether the level is lower than a line indicating the optimum level marked on each container configuring the anode-side container 130.

It is generally stated in the instruction manual of the capillary electrophoresis apparatus 1 that the anode-side container 130 should be used within two weeks after being set in the capillary electrophoresis apparatus 1 and should be replaced if more days than two weeks have elapsed. The capillary electrophoresis apparatus 1 typically includes an undepicted barcode reader. When the anode-side container 130 is set, the barcode reader reads a barcode or two-dimensional barcode attached to the anode-side container 130, and thus the microcomputer 500 manages the expiration date of the anode-side container 130. If two weeks or more have passed since setting of the anode-side container 130, the microcomputer 500 issues a warning via the input/output device 503.

As mentioned above with reference to FIG. 2, the anode-side container 130 includes three containers. Such containers are the anode-side cleaning container 131, the anode-side electrophoresis buffer solution container 132, and the sample buffer solution container 133. As mentioned above, the anode-side cleaning container 131, the anode-side electrophoresis buffer solution container 132, and the sample buffer solution container 133 are all check objects in step S201.

Subsequently, the user checks the cathode-side container 140 (S102). In step S102, the user visually checks whether each container configuring the cathode-side container 140 is set in the capillary electrophoresis apparatus 1, and visually checks a level of the cathode-side reagent, and the like. The containers configuring the cathode-side container 140 are the waste liquid container 141, the cathode-side cleaning container 142, and the cathode-side electrophoresis buffer solution container 143. As mentioned above, the cathode-side reagent collectively includes the electrophoresis buffer solution 160 stored in the cathode-side electrophoresis buffer solution container 143 and the cathode-side cleaning liquid 142*a*.

If one of the containers configuring the cathode-side container 140 is not set, the user sets a new container. If one of the reagents of the cathode-side reagent has a low level, the user replaces the corresponding container. The case where the cathode-side reagent has a low level means a case where the cathode-side reagent has a level lower than a predetermined level. Whether the level is lower than the predetermined level is determined by the user based on whether the level is lower than a line indicating the optimum level marked on each of the containers, i.e., the cathode-side cleaning container 142 and the cathode-side electrophoresis buffer solution container 143.

It is generally stated in the instruction manual of the capillary electrophoresis apparatus 1 that the cathode-side container 140 should be used within two weeks after being set in the capillary electrophoresis apparatus 1 and should be replaced if more days than two weeks have elapsed. When the cathode-side container 140 is set, the undepicted barcode reader provided in the capillary electrophoresis apparatus 1 reads a barcode or two-dimensional barcode attached to the cathode-side container 140, and thus the microcomputer 500 manages the expiration date of the cathode-side reagent. Hence, if two weeks or more have passed since setting of the cathode-side container 140, the output processing section 512 issues a warning via the input/output device 503.

As illustrated in FIG. 2, the cathode-side container 140 includes three containers. Such containers are the waste liquid container 141, the cathode-side cleaning container 142, and the cathode-side electrophoresis buffer solution container 143. As mentioned above, the waste liquid container 141, the cathode-side cleaning container 142, and the cathode-side electrophoresis buffer solution container 143 are all setting check objects in step S202.

Subsequently, the user checks the electrophoresis medium container 120 (S103). The user visually checks whether the electrophoresis medium container 120 is set in the capillary electrophoresis apparatus 1, and visually checks the level of the electrophoresis medium 120*a* stored in the electrophoresis medium container 120. If the electrophoresis medium container 120 is unset, the user sets a new electrophoresis medium container 120. When the electrophoresis medium 120*a* has a low level, the user replaces the electrophoresis medium container 120. The case where the electrophoresis medium 120*a* has a low level means a case where the level of the electrophoresis medium 120*a* is lower than a predetermined level. Whether the level is lower than the predetermined level is determined by the user based on whether the level is lower than a line indicating the optimum level marked on the electrophoresis medium container 120.

Generally, it is stated in the instruction manual of the capillary electrophoresis apparatus 1 that the electrophoresis medium container 120 should be used within two weeks after being set in the capillary electrophoresis apparatus 1 and should be replaced if more days than two weeks have elapsed. When the electrophoresis medium container 120 is set, the undepicted barcode reader provided in the capillary electrophoresis apparatus 1 reads a barcode attached to the electrophoresis medium container 120, and thus the microcomputer 500 manages the expiration date of the electrophoresis medium container 120. Hence, if two weeks or more have passed since setting of the electrophoresis medium container 120, the microcomputer 500 issues a warning to the user via the input/output device 503.

As mentioned above, expiration dates are clearly set for the consumables such as the anode-side reagent, the cathode-side reagent, and the electrophoresis medium 120*a*. In a possible case, however, a user who do not comply with the expiration dates of such consumables ignores the issued warnings and proceeds with run. Furthermore, the user may proceed with run without checking the level.

In such cases, drying of the reagent is advanced, and the electrode 221, the capillary head 302, and the hollow electrode 312 may no longer be able to come into contact with the liquid surface of the reagent. This embodiment aims to solve such a problem. As mentioned above, the reagent collectively includes the anode-side reagent, the cathode-side reagent, and the electrophoresis medium 120*a*. The above-described consumables are synonymous with reagents.

After the step S103, the user sets the sample container 150 in the capillary electrophoresis apparatus 1. The sample is prepared (adjusted) by the user for each run (S104).

The user then presses a measurement start button (not shown) displayed on the input/output device 503 (S105). The controller 600 then drives the sample tray 110. As a result, the anode-side electrophoresis buffer solution container 132 is moved with respect to the capillary head 302 and the electrode 221 to a predetermined position where the cathode-side electrophoresis buffer solution container 143 is in liquid-contact with the hollow electrode 312 in a normal state. In other words, through movement of the sample tray 110, the anode-side electrophoresis buffer solution container 132 is located at the predetermined position for the liquid-contact in the normal state. Similarly, the cathode-side electrophoresis buffer solution container 143 is located at a predetermined position. The predetermined position for the liquid-contact in the normal state is a position at which the capillary head 302, the electrode 221, and the cathode-side end of the capillary 311 (or two ends of the capillary 311) are each in contact with a liquid if the level is not decreased due to drying of the electrophoresis buffer solution 160, or the like (if the level has reached the optimum level, or if the amount of the electrophoresis buffer solution 160 is equal to or larger than the predetermined amount).

The high-voltage power supply 402 then applies a first voltage being a negative voltage to the electrophoresis buffer solution 160 stored in the cathode-side electrophoresis buffer solution container 143 (S106).

The anode-side container 130, the cathode-side container 140, the electrophoresis medium container 120, and the sample container 150 have already been set in the capillary electrophoresis apparatus 1. In the step S105, the voltage should be applied to at least one of the electrophoresis buffer solutions 160 stored in the anode-side electrophoresis buffer solution container 132 and the cathode-side electrophoresis buffer solution container 143.

The user presses the measurement start button on the input/output device 503 with each container being set, so that subsequent processing from step S111 in FIG. 6B is performed. As a result, the microcomputer 500 starts check of energization states of the reagents (consumables) and the sample prior to sample injection (S131 in FIG. 6B).

The energization check section 511 uses the electrophoresis medium 120*a* that has filled the capillary array 300 in the previous run to check the energization states of the anode-side electrophoresis buffer solution container 132 and the cathode-side electrophoresis buffer solution container 143 (S111 in FIG. 6B: First energization check step). In other words, the energization check section 511 checks the energization state between the anode-side electrophoresis buffer solution container 132 and the cathode-side electrophoresis buffer solution container 143 in the step S111 while the electrophoresis medium 120*a*, which has been used in the previous run (previous second electrophoresis), remains in the capillary 311.

If the energization state cannot be checked as a result of the step S111 (S111: Error), the energization check section 511 determines whether the "error" determination in the step S111 is the second time or not (S112). The state where energization cannot be checked in the step S112 means a state where the second ammeter 403 detects no current (current value is zero, or equal to or lower than the first value) (the same applies to the following processing: equal to or lower than the second or third value). However, the energization check section 511 may determine "error" in the step S111 when a value of the second ammeter 403 is equal to or lower than a predetermined value (the same applies to the following processing).

The reason why the energization state cannot be checked in the step S111 is probably because a circuit through which current should be passed is not formed. Specifically, this is because at least any one of the capillary head 302, the hollow electrode 312, and the electrode 221 is not in contact with the electrophoresis buffer solution 160. The main reason why liquid-contact with the electrophoresis buffer solution 160 is no longer possible while possible before is because the level of the electrophoresis buffer solution 160 is decreased due to drying.

In other words, the following is considered as the reason why the energization state cannot be checked in the step S111. Specifically, the level of the electrophoresis buffer solution 160 stored in at least any of the anode-side electrophoresis buffer solution container 132 and the cathode-side electrophoresis buffer solution container 143 decreases due to drying or the like. As a result, the capillary head 302, the hollow electrode 312, and/or the electrode 221 is/are not in contact with the electrophoresis buffer solution 160, and thus energization is inhibited. The hollow electrode 312 is thus insulated from the electrode 221, and the electrode 221 has the same potential as the GND 411. Consequently, the second ammeter 403 detects no current.

Hence, if "first time" is determined in the step S112 (S112: First time), the output processing section 512 outputs the warning screen 701 as shown in FIG. 7A to the input/output device 503 (first warning output: S113: First warning step). That is, as shown in the warning screen 701 of FIG. 7A, the output processing section 512 outputs the warning screen 701 to the input/output device 503 so as to prompt the user to check the level of the electrophoresis buffer solution 160 in the anode-side electrophoresis buffer solution container 132 and in the cathode-side electrophoresis buffer solution container 143. The warning screen 701 should be displayed with error output (such as beep). The same applies to warning screens 702 to 705 described later. The microcomputer 500 temporarily suspends measurement.

According to such a warning, the user checks the level of the electrophoresis buffer solution 160 in the anode-side electrophoresis buffer solution container 132 and that in the cathode-side electrophoresis buffer solution container 143. In other words, the user checks whether energization is possible, that is, whether the level of the electrophoresis buffer solution 160 has decreased or not due to progress of drying. As mentioned above, since a line indicating the optimum level is typically marked on the anode-side electrophoresis buffer solution container 132 and on the cathode-side electrophoresis buffer solution container 143, the user uses the line as a guide to determine whether drying has progressed. If drying has progressed, the user replaces a dried container. After that, the processing returns to the step S105 in FIG. 6A.

Generally, in the state where the capillary electrophoresis apparatus 1 is not in operation, the capillary head 302 (anode-side end of the capillary 311) is immersed in the electrophoresis buffer solution 160 stored in the anode-side electrophoresis buffer solution container 132. Similarly, in the state where the capillary electrophoresis apparatus 1 is not in operation, the cathode-side end of the capillary 311 is immersed in the electrophoresis buffer solution 160 stored in the cathode-side electrophoresis buffer solution container 143. However, it is conceivable that the electrophoresis buffer solution 160 in at least one of the containers, i.e., at least one of the anode-side electrophoresis buffer solution container 132 and the cathode-side electrophoresis buffer solution container 143, may be progressively dried under some circumstance, resulting in an insufficient level of each solution. In such a case, it is also conceivable that the electrophoresis medium 120*a* itself, which has filled the capillary 311 in the previous run, is dried out. As a result, the electrophoresis medium 120*a* filling the inside of the capillary 311 is more progressively dried. In such a case, even if the anode-side electrophoresis buffer solution container 132 and the cathode-side electrophoresis buffer solution container 143 are each replaced, normal run is difficult. In other words, if the electrophoresis medium 120*a* filling the inside of the capillary 311 has been fairly dried, even if the anode-side electrophoresis buffer solution container 132 and the cathode-side electrophoresis buffer solution container 143 are each replaced, an error is detected in the energization state in the step S111.

Hence, when the energization check section 511 determines "second time" in the step S112 (S112: Second time), the output processing section 512 outputs the warning screen 702 shown in FIG. 7B to the input/output device 503 (second warning output: S114: Second warning step). In the second warning output, as shown in FIG. 7B, since the inside of the capillary 311 is dried, the warning screen 702 is output to the input/output device 503 so as to prompt replacement of the capillary array 300. The case where the energization check section 511 determines "second time" in the step S112 is the following case. That is, it is a case that, even if the user replaces the anode-side electrophoresis buffer solution container 132 and the cathode-side electrophoresis buffer solution container 143 and performs the processing of the step S111 again after the step S113, energization cannot be checked. However, as mentioned above, the usage guarantee period for the anode-side electrophoresis buffer solution container 132 and the cathode-side electrophoresis buffer solution container 143 is fourteen days, and a warning is issued via the input/output device 503 when the usage guarantee period is over. Hence, the anode-side electrophoresis buffer solution container 132 and the cathode-side electrophoresis buffer solution container 143 are often replaced before the expiration date of the warranty, and a situation where even the inside of the capillary 311 is dried rarely occurs. In other words, "second time" is rarely determined in the step S112. However, the processing of the step S112 makes it possible to detect a situation where the inside of the capillary 311 is unfortunately dried in a state where the usage guarantee periods of the anode-side electrophoresis buffer solution container 132 and the cathode-side electrophoresis buffer solution container 143 have expired, and issue the warning.

If the energization check in the step S111 is successful (S111: OK), the sample tray 110 is moved such that the electrophoresis medium container 120 is located at a predetermined position with respect to the anode-side end of the capillary 311. The successful energization check is the case where the current value measured by the second ammeter 403 is equal to or higher than a predetermined value (the same applies to the processing below). At this time, the waste liquid container 141 is located at a predetermined position with respect to the cathode-side end of the capillary 311. The predetermined position is the position where if the level of the electrophoresis medium 120*a* is normal (if the level reaches the optimum level, or if the amount of the electrophoresis medium 120*a* is equal to or larger than the predetermined amount), the anode-side end of the capillary 311 is in liquid-contact with the electrophoresis medium 120*a* in the electrophoresis medium container 120.

The liquid feeding device 105 then introduces anew the electrophoresis medium 120*a* to be used in the upcoming run into the capillary array 300 (S121). As a result, a pre-run (processing on the first electrophoresis) is performed. Although the liquid feeding device 105 performs the pre-run in the step S121, if the level of the electrophoresis medium 120*a* is insufficient, the electrophoresis medium 120*a* is not introduced into the capillary 311. Furthermore, if air bubbles are mixed into the electrophoresis medium 120*a* that is newly fed into the capillary array 300 in the step S121, energization of the capillary 311 is inhibited.

To check this, the energization check section 511 performs a pre-run energization check (S122: Second energization check step). The pre-run (first electrophoresis) is to electrophorese the electrophoresis medium 120*a* prior to electrophoresis of the sample, as mentioned above. In the pre-run, the high-voltage power supply 402 generates a potential difference between the two ends of the capillary 311, so that the electrophoresis medium 120*a* is electrophoresed into the capillary 311.

The energization states of the anode-side electrophoresis buffer solution container 132 and the cathode-side electrophoresis buffer solution container 143 have already been checked in the step S111. Consequently, if an error occurs in the step S122, it can be determined that the error is caused by the newly introduced electrophoresis medium 120*a*. In the step S122, the high-voltage power supply 402 may newly apply a voltage (first voltage), or may continue to apply the voltage from the step S106 (the same applies to step S124 described later).

If the energization state cannot be checked in the step S122 (S122: Error), the output processing section 512 displays a warning screen 703 as shown in FIG. 7C (third warning output: S123: Third warning step).

In the step S123, along with the error output, the output processing section 512 displays a warning screen 703 on the input/output device 503 so as to prompt check of a setting state of the electrophoresis medium container 120, the level of the electrophoresis medium 120*a*, and air bubbles in the capillary array 300, as shown in FIG. 7C. Check of air bubbles means check of presence or absence of air bubbles as shown in FIG. 7C. The user checks the setting state of the electrophoresis medium container 120, the level of the electrophoresis medium 120*a*, or presence or absence of air bubbles in the capillary array 300, with reference to the warning screen 703 output in the step S123. After that, the processing returns to the step S105 in FIG. 6A. In this way, the energization state is checked at the stage of the step S111, making it possible to identify the error in the step S122 to be caused by the newly introduced electrophoresis medium 120*a*.

If the energization state can be checked in the step S122 (S122: OK), the sample tray 110 is moved such that the sample buffer solution container 133 is located at a predetermined position with respect to the capillary head 302 and the electrode 221. At this time, the sample container 150 is located at a predetermined position with respect to the anode-side terminal of the capillary 311. The predetermined position is typically a position at which sample injection is performed. That is, the predetermined position is a position where if the sample reagent 150*a* and the sample buffer solution 133*a* are each in a normal amount (a predetermined amount or more), the capillary head 302 and the electrode 221 are in liquid-contact with the sample buffer solution 133*a*, and the cathode-side end of the capillary 311 is in liquid-contact with the sample reagent 150*a*. In other words, the predetermined position is a position where if the sample reagent 150*a* and the sample buffer solution 133*a* each have reached the optimum level (if each having a predetermined amount or more), one of the ends of the capillary 311 is in liquid-contact with the sample reagent 150*a*, and the other end is in liquid-contact with the sample buffer solution 133*a*.

The first voltage is then applied to the sample reagent 150*a* stored in the sample container 150.

The energization check section 511 then checks the energization state (S124: Third energization check step). Through the check of the energization state in the step S124, the levels of the sample reagent 150*a* and the sample buffer solution 133*a* are checked.

If the energization state cannot be checked (S124: Error), the energization check section 511 determines that poor contact occurs in each of two sites. The two sites refer to the sample container 150 and the sample buffer solution container 133. Hence, the output processing section 512 outputs information to prompt check of the energization state to the input/output device 503 (fourth warning output: S125: Fourth warning step). At this time, the input/output device 503 displays a warning screen 704 to prompt check of the sample container 150 and the sample buffer solution container 133, as shown in FIG. 7D. Check of the sample container 150 and the sample buffer solution container 133 means check of levels of the sample reagent 150*a* stored in the sample container 150 and the sample buffer solution 133*a* stored in the sample buffer solution container 133.

In this way, at the stage of the step S125, the user can respond quickly to error because error cause points have already been specified to the two points (the sample container 150 and the sample buffer solution container 133).

If the sample energization check is successful in the step S124 (S124: OK), the capillary electrophoresis apparatus 1 performs sample injection into the capillary array 300 (S131). The sample injection is performed by applying a second voltage higher than the first voltage to the sample reagent 150*a* by the high-voltage power supply 402. An electrical injection method using electrophoresis is often used to introduce the sample. Subsequently, the capillary electrophoresis apparatus 1 starts run (second electrophoresis) (S132).

The energization check section 511 then continues to check the energization state of the energization path even during the run (S133: Fourth energization check step).

If the run is successfully completed, i.e., if the energization state is continuously checked during the run as a result of the energization check in the step S133 (S133: OK), the microcomputer 500 ends the electrophoresis.

In contrast, if the energization cannot be checked (equal to or lower than a fourth value) during the run (S133: Error), the output processing section 512 outputs, to the input/output device 503, information indicating that a run error has occurred (S134: Fifth warning steps). Subsequently, the output processing section 512 outputs information to prompt contact with a service (S135: Fifth warning step). Possible causes of the error in the stage of the step S133 include electric discharge due to damage to the capillary 311, liquid leakage, and invisible air bubbles within the capillary 311. In such a case, since it is difficult for the user to deal with such phenomena, FIG. 7E for prompting contact with a service shows an example in which the content output in the step S134 and the content output in the step S135 are output in one warning screen 705. In the step S135, however, it is also possible to perform display to prompt replacement of all consumables. In this way, the energization check is performed in stages in the steps S111, S122, and S124, which makes it possible to identify an error in the stage of the step S133 to be caused by electric discharge due to damage to the capillary 311, liquid leakage, invisible air bubbles within the capillary 311, or the like.

COMPARATIVE EXAMPLE

FIG. 8 is a flowchart illustrating a procedure of the electrophoresis assistance method (comparative example) in a capillary electrophoresis apparatus in the past.

In FIG. 8, the same process as that in FIG. 6B is designated by the same step number, and duplicated description is omitted. In FIG. 8, processes different from those in FIG. 6B are described. Since processes with FIG. 6A are the same as in the comparative example, illustration of the processes is omitted in the comparative example.

The processing shown in FIG. 8 differs from that in FIG. 6B in the following points.

(A1) The process of the step S111 is omitted.

(A2) If an error is detected in the step S122, S124, or S133, a run error is displayed (S141), and rerun is performed after inspection and replacement of the consumables (S142). Replacement of the consumables in the step S142 means replacement of all containers.

The usefulness of the step S111 shown in FIG. 6B becomes apparent when compared to the flowchart shown in FIG. 8. In the capillary electrophoresis apparatus in the past, as shown in FIG. 8, the electrophoresis medium 120*a* is fed in the step S121 without the step S111 shown in FIG. 6B. In the flowchart shown in FIG. 8, the pre-run energization check in the step S122 is the first electrical energization check. Even if abnormality is detected at the point of the step S122, it is difficult to distinguish whether the abnormality is caused by the electrophoresis buffer solution 160, by the electrophoresis medium 120*a*, or by air bubbles in the capillary 311. The reason for this is as follows: Whether abnormality has occurred in energization of the anode-side electrophoresis buffer solution container 132 or the cathode-side electrophoresis buffer solution container 143 is not checked beforehand (before the step S121). Furthermore, in the method shown in FIG. 8, since an error is found after the electrophoresis medium 120*a* has been fed into the capillary array 300, the electrophoresis medium 120*a* is wasted. The electrophoresis medium 120*a* is the most expensive of the reagents for electrophoresis, and this leads to an increase in running costs.

Thus, in the capillary electrophoresis apparatus in the past, abnormality in energization is checked only after the pre-run energization check (S122) shown in FIG. 8. Even if an error is detected in the pre-run energization check, as mentioned above, it is difficult for the user to identify whether the error is caused by the electrophoresis buffer solution 160, by the electrophoresis medium 120*a*, or by air bubbles in the capillary 311. The user therefore needs to wholly inspect the anode-side electrophoresis buffer solution container 132, the cathode-side electrophoresis buffer solution container 143, the electrophoresis medium container 120, and the capillary array 300, and needs to completely stop the current run. Such inspection may take a long time. Furthermore, when restarting run, the run must be started from the beginning (from the step S101 in FIG. 6A).

To improve this situation, this embodiment provides a method where the energization state of the reagent is checked before the pre-run energization check (step S122 in FIG. 6B), thereby the microcomputer 500 determines whether the reagent should be replaced, and as a result, prompts the user to check or replace an abnormal consumable. Consequently, it is possible to narrow down the cause of the error to a specific reagent when an error occurs, and on the basis of such information, only the corresponding reagent needs to be replaced, and thus the run can be resumed while being not completely stopped (with only a temporary interruption). When resumed, operation can be resumed from the point of the suspension. As a result, usability of the capillary electrophoresis apparatus 1 can be significantly improved.

For example, in this embodiment, if the input/output device 503 outputs an error in the step S122, the cause of the error can be identified to be caused by the electrophoresis medium 120*a*, and thus the run can be continued quickly by checking the problems of the setting state of the electrophoresis medium container 120 and the level of the electrophoresis medium 120*a* and performing correction.

In other words, in the method shown in FIG. 6B, the energization check section 511 checks the energization states of the consumables each time in steps S111, S122, and S124, and then the procedure proceeds to the subsequent step. As a result, when an error occurs, a portion causing the error is limited, and different warning screens 701 to 705 are displayed for respective errors. This makes it easy to resolve errors. In the method shown in FIG. 8, when an error occurs, only run error output in the step S141 is displayed as information. Even if it is possible to classify an error in each of the steps S122, S124, and S133, it is difficult to identify at the stage of the step S122 whether the error is caused by the electrophoresis buffer solution 160, by the electrophoresis medium 120*a*, or by the air bubbles in the capillary 311.

In the method shown in FIG. 8, therefore, the user is less likely to narrow down the cause of the error, and must stop the current run and search for the cause of the error one by one. Consequently, the user may have to abandon the run. In contrast, using the method provided in this embodiment (the method shown in FIG. 6B) makes it possible to significantly reduce occurrence of a run error that completely interrupts the run. As a result, usability of the capillary electrophoresis apparatus 1 can be significantly improved.

Furthermore, as a notable effect of the method shown in FIG. 6B, it is possible to prevent waste of the electrophoresis medium 120*a*, the most expensive of the reagents. Although the electrophoresis medium 120*a* is expensive in general, before introducing the expensive electrophoresis medium 120*a* into the capillary array 300, specifically, in the step S11*l* of the method shown in FIG. 6B, the energization state between the anode-side electrophoresis buffer solution container 132 and the cathode-side electrophoresis buffer solution container 143 is beforehand checked. Consequently, if there is no abnormality in the energization environment other than the electrophoresis medium 120*a* before feeding the electrophoresis medium 120*a*, and if abnormality occurs during feeding of the electrophoresis medium 120*a*, the cause of the abnormality can be limited to the electrophoresis medium 120*a*. In other words, it is possible to reduce the probability of wasting the electrophoresis medium 120*a* due to a reagent other than the electrophoresis medium 120*a*. This can contribute to reducing the running cost of the reagents.

In the method shown in FIG. 6B, when an error is detected in the step S122 or step S124, the processing returns to the step S105. In other words, the sample tray 110 returns to "anode-side electrophoresis buffer solution container 132-cathode-side electrophoresis buffer solution container 143". Such operation is not performed in the comparative example shown in FIG. 8.

Thus, in this embodiment, the energization check section 511 checks the energization state of the energization path at appropriate timings. This makes it possible to identify the error source and take an immediate countermeasure. Consequently, the user can correct the error on the basis of the instructions displayed on the input/output device 503 without completely stopping the run. In addition, a run that has been once interrupted can be promptly resumed. Furthermore, a consumable that causes an error can be identified, making it possible to avoid replacing a consumable irrelevant to the error. As a result, running costs can be reduced.

According to this embodiment, it is also possible to avoid waste of a biological sample being a valuable reagent. This also greatly contributes to usability, because a trace sample from a specimen cannot be easily purchased.

There is an optical method as a method without using electric signals for detecting states of the electrophoresis buffer solution 160, the electrophoresis medium 120*a*, and the sample. However, the optical method is expensive and complicated. In the method provided in this embodiment, since the reagent state can be checked using only electrical signals, cost reduction can be achieved.

In this embodiment, an error is detected when the current value is zero in the step S111, S122, S124, or S133. However, without being limited to this, an error may be detected when the current value is equal to or smaller than a predetermined value.

Although the processing returns to the step S105 after the step S123 in this embodiment, the processing may return to the step S121. Similarly, although the processing returns to the step S105 after the step S125, the processing may return to the step S124.

It should be noted that the present invention is not limited to the examples described above, and includes various modification examples. For example, the examples described above have been described in detail to simply describe the present invention, and are not necessarily required to include all the described configurations. In addition, part of the configuration of one embodiment can be replaced with the configurations of other embodiments, and in addition, the configuration of the one embodiment can also be added with the configurations of other embodiments. In addition, part of the configuration of each of the embodiments can be subjected to addition, deletion, and replacement with respect to other configurations.

The above-described configurations, functions, sections 511 and 512, storage device 502, and the like may be enabled by hardware by designing some or all of them with an integrated circuit, for example. Furthermore, as illustrated in FIG. 5, the configurations, functions, and the like may be enabled by software with a processor such as the CPU 501 that interprets and executes a program enabling each function. Information such as a program, a table, or a file to enable each function can be stored not only in a read only memory (ROM) or a random access memory (RAM), but also in a storage device such as a hard disk (HD) and a solid state drive (SSD), or in a storage medium such as an integrated circuit (IC) card, a secure digital (SD) card, and a digital versatile disc (DVD).

In the embodiment, the shown control lines and information lines are those considered necessary for illustrative purposes and not necessarily include all control lines and information lines for products. Almost all configurations may be considered to be actually interconnected.

LIST OF REFERENCE SIGNS

1 Capillary electrophoresis apparatus (electrophoresis apparatus, electrophoresis system)
100 Autosampler unit
110 Sample tray
120 Electrophoresis medium container
120*a* Electrophoresis medium
130 Anode-side container
131 Anode-side cleaning container
131*a* Anode-side cleaning liquid
132 Anode-side electrophoresis buffer solution container
132*a* Anode-side electrophoresis buffer solution
133 Sample buffer solution container
133*a* Sample buffer solution
140 Cathode-side container
141 Waste liquid container
142 Cathode-side cleaning container
143 Cathode-side electrophoresis buffer solution container
160 Electrophoresis buffer solution
150 Sample container
150*a* Sample reagent (including sample)
160 Electrophoresis buffer solution
200 Irradiation detection/thermostatic oven unit
201 Irradiation detection unit
300 Capillary array
301 Load header
302 Capillary head
311 Capillary
312 Hollow electrode
401 First ammeter
402 High-voltage power supply (power supply)
403 Second ammeter
411, 412 GND
500 Microcomputer (processor)
511 Energization check section
512 Output processing section
701 Warning screen (output prompting check of level of the electrophoresis buffer solution)
702 Warning screen (output indicating that the inside of the capillary is dried)
703 Warning screen (output prompting check of level of electrophoresis medium and air bubbles within capillary)
704 Warning screen (output prompting check of level of sample reagent in sample container and level of sample buffer solution stored in sample buffer solution container)
705 Warning screen
S111 Check of energization state (first energization check step)
S113 First warning output (first warning step)
S114 Second warning output (second warning step)
S121 Introduction of electrophoresis medium (processing for first electrophoresis)
S122 Pre-run energization check (second energization check step)
S123 Third warning output (third warning step)
S124 Check of energization state (third energization check step)
S125 Fourth warning output (fourth warning step)
S132 Start of run (second electrophoresis)
S133 Check of energization state (fourth energization check step)
S134 Run error display (fifth warning step)
S135 Display of prompt to contact with service (fifth warning step)

The invention claimed is:

1. An electrophoresis assistance method, comprising, in an electrophoresis method:

performing: a first electrophoresis such that a power supply generates a potential difference between two ends of a capillary, and thus an electrophoresis medium is electrophoresed into the capillary; and, after the first electrophoresis, a second electrophoresis such that the power supply generates the potential difference between the two ends of the capillary, and thus a sample added to the electrophoresis medium is electrophoresed into the capillary; and performing, in the second electrophoresis, component separation of the sample according to a difference in speed at which the sample moves within the capillary, due to the potential difference across the capillary generated by the power supply, wherein a processor performs:

a first energization check step which:

detects, after a previous second electrophoresis is ended and before the first electrophoresis is performed, in a state where the electrophoresis medium used in the previous second electrophoresis remains within the capillary, and when the amount of an electrophoresis buffer solution stored in each separate container is equal to or larger than a predetermined amount, and the two ends of the capillary are located at predetermined positions where the two ends of the capillary are each in contact with the electrophoresis buffer solution, whether a measurement value satisfies a first predetermined criteria indicating a first error, the measurement value being based on either (a) a current flowing through the capillary, the current being based on the potential difference generated between the two ends of the capillary by applying a voltage to at least one of the electrophoresis buffer solutions by the power supply, or (b) the potential difference between the two ends of the capillary; and a first warning step in which, when the measurement value does satisfy the first predetermined criteria in the first energization check step, an output section performs an output to prompt check of a level of the electrophoresis buffer solution.

2. The electrophoresis assistance method according to claim 1, wherein after the output is performed to prompt check of the level of the electrophoresis buffer solution, the first energization check step is performed again, and when the measurement value satisfies the first predetermined criteria as a result of the first energization check step being performed again, a second warning step is performed such that output is performed to indicate that the inside of the capillary is dried.

3. The electrophoresis assistance method according to claim 1, wherein in the first energization check step, when the measurement value does not satisfy the first predetermined criteria, processing on the first electrophoresis is performed, and the processor performs:

a second energization check step of detecting whether the measurement value satisfies a second predetermined criteria indicating a second error during the processing on the first electrophoresis, and a third warning step of outputting a warning from the output section when the measurement value satisfies the second predetermined criteria in the second energization check step.

4. The electrophoresis assistance method according to claim 3, wherein in the third warning step, an output is performed to prompt check including check of a level of the electrophoresis medium in the electrophoresis medium container storing the electrophoresis medium to be introduced in the first electrophoresis, and including check of air bubbles within the capillary.

5. The electrophoresis assistance method according to claim 4, wherein in the second energization check step, when the measurement value does not satisfy the second predetermined criteria, and when amount of a sample reagent, the sample reagent being stored in a sample container, and amount of a sample buffer solution, the sample buffer solution being stored in a sample buffer solution container to introduce the sample into the capillary, are each a predetermined amount or more, in a state where the two ends of the capillary are located at positions where one end is in liquid-contact with the sample reagent and the other end is in liquid-contact with the sample buffer solution, the processor performs:

a third energization check step of detecting whether the measurement value satisfies a third predetermined criteria indicating a third error by applying a voltage by the power supply to the sample reagent and/or the sample buffer solution, and a fourth warning step of outputting a warning from the output section when the measurement value satisfied the third predetermined criteria in the third energization check step.

6. The electrophoresis assistance method according to claim 5, wherein in the fourth warning step, an output is performed to prompt check of a level of the sample reagent in the sample container and a level of the sample buffer solution stored in the sample buffer solution container.

7. The electrophoresis assistance method according to claim 6, wherein in the third energization check step, when the measurement value does not satisfy the third predetermined criteria, the second electrophoresis is performed, and the processor performs:

a fourth energization check step of detecting whether the measurement value, the measurement value being caused by the voltage applied to at least one end of the capillary during the second electrophoresis, satisfies a fourth predetermined criteria indicating a fourth error, and a fifth warning step of outputting a warning from the output section when the measurement value does satisfy the fourth predetermined criteria in the fourth energization check step.

* * * * *